United States Patent [19]

Gerlach et al.

[11] Patent Number: 4,549,969

[45] Date of Patent: * Oct. 29, 1985

[54] PROCESS AND AN APPARATUS FOR ENRICHING LIQUIDS WITH OXYGEN

[75] Inventors: Klaus Gerlach, Aschaffenburg; Wolfgang Lange, Obernburg; Dieter Loh, Erlenbach, all of Fed. Rep. of Germany

[73] Assignee: Akzo NV, Arnhem, Netherlands

[*] Notice: The portion of the term of this patent subsequent to Apr. 3, 2001 has been disclaimed.

[21] Appl. No.: 571,514

[22] Filed: Jan. 16, 1984

Related U.S. Application Data

[63] Continuation-in-part of Ser. No. 313,755, Oct. 22, 1981, Pat. No. 4,440,648.

[30] Foreign Application Priority Data

Aug. 11, 1980 [DE] Fed. Rep. of Germany ....... 3042281

[51] Int. Cl.$^4$ ............................................. C02F 1/72
[52] U.S. Cl. .................................. 210/759; 210/763; 210/192; 210/220
[58] Field of Search ............... 210/759, 763, 758, 169, 210/198.1, 192, 220; 422/41, 905; 423/589

[56] References Cited

U.S. PATENT DOCUMENTS

| | | | |
|---|---|---|---|
| 1,379,221 | 5/1921 | Scott et al. | 423/586 |
| 2,001,989 | 5/1935 | Theuerkauf | 210/759 |
| 3,992,282 | 11/1976 | Grosboll et al. | 210/763 |
| 4,294,703 | 10/1981 | Wilms et al. | 210/763 |

FOREIGN PATENT DOCUMENTS 2211890 9/1973 Fed. Rep. of Germany ...... 210/763

Primary Examiner—Benoit Castel
Attorney, Agent, or Firm—Michael J. Striker

[57] ABSTRACT

Process and apparatus for enriching liquids with oxygen by means of a catalyst and a liquid which gives off oxygen under the effect of that catalyst. The process involves passing the oxygen-yielding liquid through a porous molding, in the pores of which the catalyst is incorporated in known manner, thereby giving off oxygen, the side of the porous molding which gives off a greater quantity of oxygen being in contact with the liquid to be enriched with oxygen. The oxygen-yielding liquid is passed through the porous molding under its own static pressure, or under the effect of the excess pressure built up in the container through the formation of oxygen. Preferred embodiments include use of 0.1 to 5% solution of hydrogen peroxide as the oxygen-yielding liquid; using manganese dioxide, $Fe_2O_3$ or nickel oxide as the catalyst. The apparatus for carrying out the process includes a storage vessel containing the liquid which gives off oxygen under the effect of a catalyst, connecting means, and a porous molding connected thereby to the storage vessel and containing the catalyst, the molding being completely immersible in the liquid to be enriched with oxygen. Alternatively, the storage vessel and the porous molding can be dipped into the liquid to be enriched with oxygen, so that at least the entire molding is immersed.

8 Claims, 3 Drawing Figures

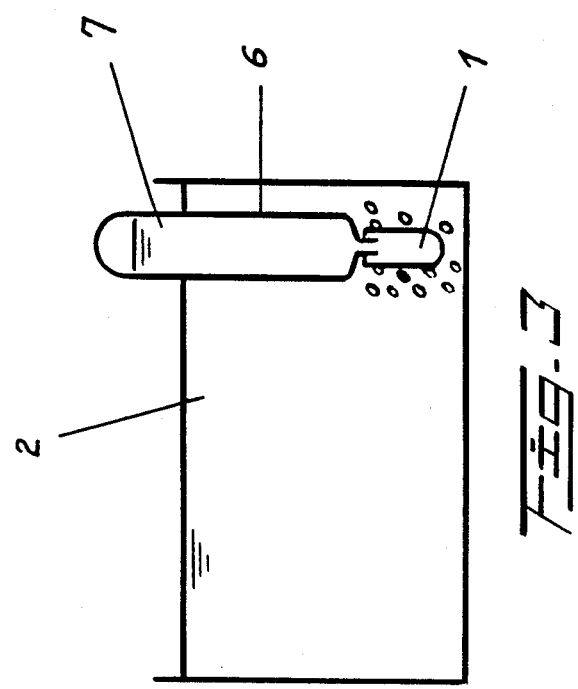

PROCESS AND AN APPARATUS FOR ENRICHING LIQUIDS WITH OXYGEN

CROSS-REFERENCE TO RELATED APPLICATION

This is a continuation-in-part of Application Ser. No. 313,755, filed Oct. 22, 1981, now U.S. Pat. No. 4,440,648.

BACKGROUND OF THE INVENTION

This invention relates to a process, to an apparatus and to the use of this apparatus for enriching liquids with oxygen by means of a catalyst and a liquid which gives off oxygen under the effect of that catalyst.

The enrichment of liquids with oxygen by means of a catalyst and a liquid which gives off oxygen under the effect of that catalyst is known from U.S. Pat. No. 3,542,524. This U.S. Patent describes an apparatus in which a catalyst fixed to a vertically displaceable rod may be brought into contact with the oxygen-yielding liquid by displacement of said rod in a storage vessel containing the oxygen-yielding liquid. In general, the oxygen-yielding liquid is hydrogen peroxide. Oxygen is given off under the effect of the catalyst, water being formed at the same time. As a result, the concentration of the hydrogen perioxide solution in the storage vessel decreases continuously. The lower the concentration of hydrogen peroxide in the storage vessel, the smaller the quantity of oxygen given off.

The apparatus according to U.S. Pat. No. 3,542,524 is attended by the disadvantage that it is only possible with considerable difficulty, if at all, to tell at what time the amount of oxygen being given off is no longer sufficient to supply the liquid to be enriched with oxygen. In addition, complications are involved in replacing the hydrogen peroxide solution.

SUMMARY OF THE INVENTION

It has now been found in accordance with the invention that, by incorporating a catalyst in the pores of a porous moulding and passing an oxygen-yielding liquid through this porous moulding containing the catalyst, the liquid to be enriched with oxygen is always supplied with sufficient oxygen providing a supply of oxygen-yielding liquid is present.

Accordingly, the object of the present invention is to provide a process for enriching liquids with oxygen and an apparatus for carrying out this process which eliminate the disadvantages referred to above and by virtue of which the liquid to be enriched with oxygen continuously receives an adequate supply of oxygen. In addition, the handling of an apparatus for carrying out the process according to the invention is intended to be considerably improved and simplified. Furthermore, the supply of oxygen is intended to be particularly reliable.

According to the invention, this object is achieved by a process of the type mentioned at the beginning which is distinguished by the fact that the oxygen-yielding liquid is passed through a porous moulding, in the pores of which the catalyst is incorporated in known manner, and gives off oxygen in the process, that side of the porous moulding which gives off the greater quantity of oxygen being in contact with the liquid to be enriched with oxygen. Any mouldings in the pores of which a catalyst may be incorporated may be used for this purpose. The catalyst may be incorporated for example by a process of the type described in DE-OS No. 28 08 293.

In the context of the invention, "that side of the porous moulding which gives off the greater quantity of oxygen" is understood to be that side which gives off more than 70% of the oxygen formed by the catalyst. However, the entire amount of oxygen formed may also be given off on that side, depending on the process.

It is best for the oxygen-yielding liquid to be passed through the porous moulding under the effect of its own static pressure. This eliminates the need for such units as pumps or the like. However, if the static pressure is not high enough, it may be increased in known manner by placing the storage vessel under pressure, for example under a gas pressure.

Another preferred process is distinguished by the fact that the oxygen-yielding liquid is introduced into a container, after which this container is closed with the porous moulding and dipped with the porous moulding into the liquid to be enriched with oxygen so that at least the entire porous moulding is immersed therein, and further by the fact that the oxygen-yielding liquid is forced through the porous moulding under the effect of the excess pressure built up in said container through the formation of oxygen, again giving off oxygen which for the most part is fed to the liquid to be enriched with oxygen.

Accordingly, the invention provides a process for enriching liquids with oxygen which, once it has been started up and as long as oxygen-yielding liquid is present in the container, supplies enough oxygen continuously and particularly reliably in the absence of any outside influence. The amount of oxygen supplied may be controlled through the size of the porous moulding and through the concentration of the oxygen-yielding liquid.

In the process according to the invention, an approximately 0.1 to 5% hydrogen peroxide solution is preferably used as the oxygen-yielding liquid and manganese dioxide, $Fe_2O_3$ or nickel oxide preferably used as the catalyst.

An apparatus particularly suitable for carrying out the process is distinguished by the fact that a storage vessel containing a liquid which gives off oxygen under the effect of a catalyst is closed with a porous moulding containing the catalyst and dipped with the porous moulding into the liquid to be enriched with oxygen so that at least the entire porous moulding is immersed therein. This apparatus represents an independently operating system which, irrespective of whether it is immersed in the liquid to be enriched with oxygen, reliably supplies oxygen in the absence of any intervention from outside for as long as the storage vessel contains oxygen-yielding liquid.

In one preferred embodiment of this apparatus, the porous moulding containing the catalyst is a tube having at least one empty space extending over its entire length, one end of the tube being tightly sealed and the other end of the tube being tightly connected to a pipe leading to the storage container or to the storage container itself.

An internal diameter of at least 0.5 mm for the empty space extending over the entire length of the tube has proved to be advisable. In addition, it is of advantage for the tube to be made of porous polypropylene, MgO, $Al_2O_3$ or clay. However, the porous moulding may also be made of any other material providing a catalyst can be incorporated therein. According to the invention, any of these mouldings may be used in the process for enriching liquids with oxygen.

Preferred applications for the process and for the apparatus for carrying it out are the supply of oxygen to aquariums and in the treatment of water.

The novel features which are considered characteristic for the invention are set forth in particular in the appended claims. The invention itself, however, both as to its composition and its method of use, together with additional objects and advantages thereof, will be best understood from the following description of specific embodiments.

BRIEF DESCRIPTION OF THE DRAWING

FIG. 3 shows a variation in which the storage vessel is immersed in the liquid to be enriched with oxygen.

DESCRIPTION OF THE PREFERRED EMBODIMENTS

Three apparatus suitable for carrying out the process are described in the following Examples with reference to FIGS. 1, 2 and 3 of the accompanying drawings.

EXAMPLE 1

Figure 1:
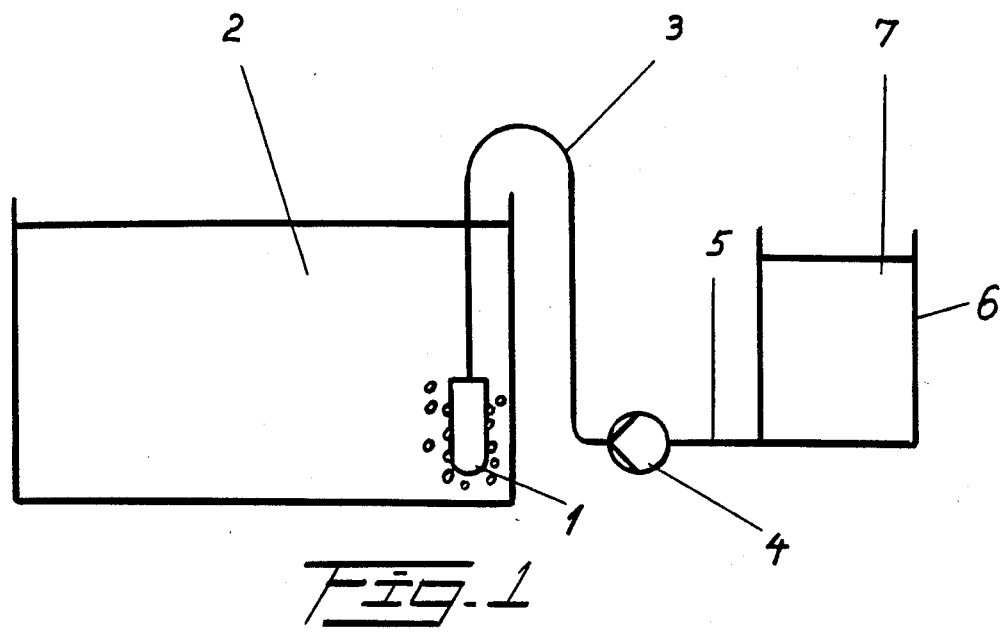
FIG. 1 is a schematic representation of an apparatus for enriching liquids with oxygen, using a metering pump for adjusting the supply of oxygen-yielding liquid.

The apparatus shown in FIG. 1 for enriching liquids with oxygen consists of a porous moulding 1 which contains ruthenium oxide as catalyst and which is totally immersed in the liquid to be supplied with oxygen. The porous moulding 1 is connected by a pipe 3 to a metering pump 4 of which the suction side is connected by a pipe 5 to a storage vessel 6. The storage vessel 6 accommodates a 2% hydrogen peroxide solution 7. The porous moulding is a porous, flexible polypropylene tube 3 to 5 cm long with an internal diameter of 3 mm and an external diameter of 9 mm.

It was possible that this apparatus for an aquarium to be supplied with sufficient oxygen, the hydrogen peroxide solution being pumped through the moulding 1 by the pump 4. The quantity of hydrogen peroxide solution to be pumped through the moulding depends upon the quantity of oxygen required in the aquarium and may be introduced at a constant rate through the metering pump 4. The storage vessel may readily be topped up with hydrogen peroxide solution while the system is in operation.

The quantity of oxygen to be supplied may be adjusted on the one hand through the concentration of hydrogen peroxide and, on the other hand, through the output of the metering pump.

EXAMPLE 2

Figure 2:
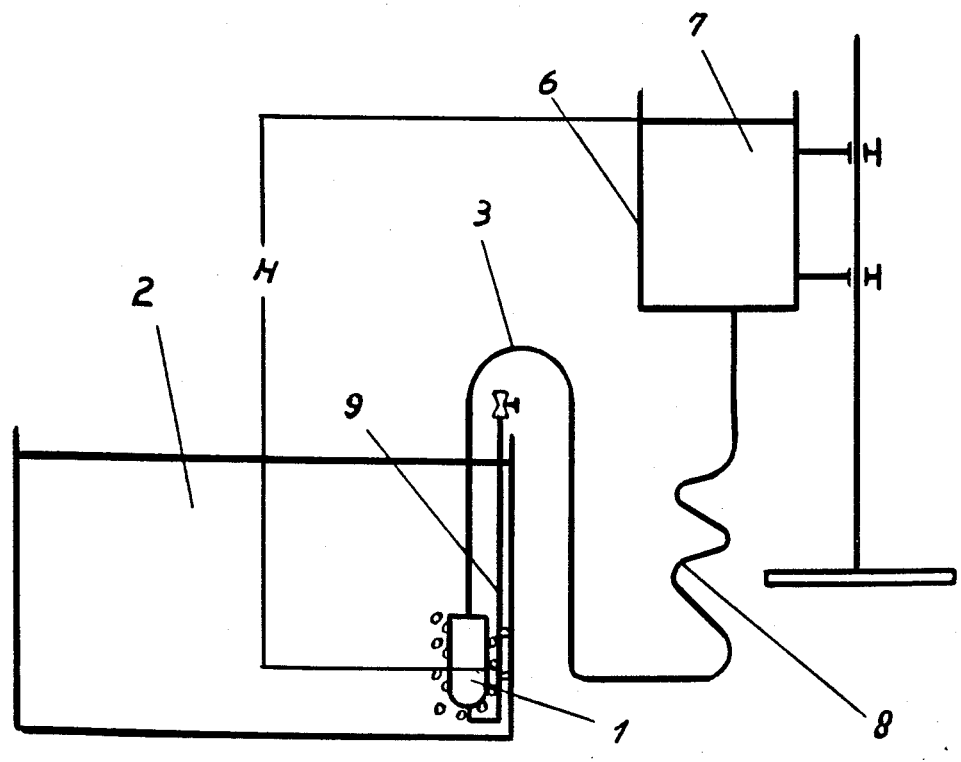
FIG. 2 shows a variation of the apparatus, with a variable level for the storage vessel, and a vent for starting up.

The apparatus shown in FIG. 2 consists of a moulding 1 in the form of a small tube (3 mm diameter bore) containing ruthenium hydroxide as catalyst, this small tube being connected at one end to a vent 9 and, at its other end, to a storage vessel 6 through a pipe 3 and a hose 8, the storage vessel 6 being variable in its level H. The porous moulding 1 is completely immersed in the liquid to be enriched with oxygen. The storage vessel 6 contains a hydrogen peroxide solution having a concentration of 5%. The quantity of oxygen to be given off may be adjusted by adjusting the level or even by altering the concentration of hydrogen peroxide. In order to start up the system, it has to be vented through the vent 9. If the storage vessel 6 is always filled at the right time, the system may be kept in operation continuously.

EXAMPLE 3

The apparatus shown in FIG. 3 consists of a transparent glass bottle 6 as the storage vessel which contains hydrogen peroxide as the oxygen-yielding liquid. A porous moulding which contains ruthenium hydroxide as catalyst and which consists of a porous polypropylene hose having an internal diameter of 3 mm and an external diameter of 5 mm, one end of the hose being tightly welded, is tightly connected to the opening of the glass storage bottle.

The storage bottle is then immersed together with the polypropylene hose (moistened with ethanol beforehand to obtain better wetting with water) in the liquid to be enriched with oxygen. When the storage bottle is immersed, the evolution of oxygen begins, as reflected in the fact that bubbles ascend in the storage bottle. As a result, an excess pressure is built up in the storage bottle. In the case of the storage bottle shown in FIG. 3, the pressure measured was 0.3 bar higher than the pressure prevailing in the atmosphere around it. This is sufficient to initiate the release of oxygen to the liquid surrounding the polypropylene hose.

The polypropylene hose is best wetted with ethanol or acetone and then rinsed with water. The polypropylene hose remains stable for an almost indefinite period.

In general, the size of the storage bottle is selected in such a way that it is refilled every 2 to 4 weeks.

Tables I and II below show how much oxygen was given off over that period to the liquid to be enriched with oxygen in dependence upon the supply of hydrogen peroxide.

TABLE I

| Concentration of $H_2O_2$ (%) | Supply (ml) | Evolution of oxygen (ml of $O_2$/h) |
| --- | --- | --- |
| 3 | 140 | 48 |
| 2.2 | 60 | 26 |
| 2 | 35 | 20 |

TABLE II

| Concentration of $H_2O_2$ (%) | Supply (ml) | Evolution of oxygen (ml of $O_2$/h) |
| --- | --- | --- |
| 1 | 140 | 15 |
| 0.7 | 85 | 9 |
| 0.4 | 35 | 3 |

Tables I and II show that the concentration of hydroen peroxide in the solution accommodated in the storage bottle decreases with a diminishing supply. Accordingly, the hydrogen peroxide solution to be introduced into the storage bottle must have a concentration which is still capable of giving off a sufficient quantity of oxygen, even in the event of a diminishing supply.

It was possible with an apparatus of the type shown in FIG. 3 to supply aquariums of various sizes with sufficient oxygen, irrespective of whether the aquarium contained seawater or fresh water. At the same time, it was found where the apparatus in question was used in aquariums that the concentration of carbon dioxide in the aquarium increased in such a way that plant growth was healthy and abundant.

EXAMPLES 4, 5 AND 6

According to Example 2, the arrangement represented in FIG. 3 is employed, which contains a transparent glass supply bottle filled with hydrogen peroxide. The opening of this glass supply container is, moreover, tightly connected with a porous-shaped body containing the catalyst in the pores, which is composed of a porous polypropylene tubing having an interior diameter of 3 mm and an outer diameter of 5 mm, whereby one end of the tubing is tightly welded together. As catalysts, manganese dioxide (brownstone), $Fe_2O_3$ or nickel oxide are embedded in the pores of the porous polypropylene tube.

The supply container is then, with the polypropylene tubing, previously moistened with ethanol for better water wetting, immersed downwardly into the liquid to be provided with oxygen. By means of rising gas bubbles it can be recognized that the development of oxygen takes place. By means of this oxygen development there arises an excess pressure in the supply container, which is measured in each case, whereby the oxygen delivery takes place into the liquid surrounding the polypropylene tube.

In the following Tables is set forth which pressure is present at the start of oxygen development, and how much oxygen, depending upon the supply of hydrogen peroxide, depending upon the hydrogen peroxide solution contained in the supply container, and depending upon the above-mentioned catalysts, is delivered into the liquid to be enriched with oxygen.

TABLE III

Catalyst: Manganese Dioxide (Brownstone)
Starting pressure in the Supply Container: 0.35 bar

| Concentration of $H_2O_2$ (%) | Supply (ml) | Evolution of oxygen (ml $O_2$/h) |
| --- | --- | --- |
| 3 | 150 | 52 |
| 2 | 60 | 24 |
| 1.5 | 30 | 13 |

TABLE IV

Catalyst: Manganese Dioxide (Brownstone)

| Concentration of $H_2O_2$ (%) | Supply (ml) | Evolution of oxygen (ml $O_2$/h) |
| --- | --- | --- |
| 1 | 135 | 14 |
| 0.6 | 90 | 8 |
| 0.4 | 40 | 3.5 |

TABLE V

Catalyst: $Fe_2O_3$
Starting pressure in the Supply Container: 0.25 bar

| Concentration of $H_2O_2$ (%) | Supply (ml) | Evolution of oxygen (ml $O_2$/h) |
| --- | --- | --- |
| 3.2 | 130 | 47 |
| 2.0 | 60 | 24 |
| 1.8 | 40 | 21 |

TABLE VI

Catalyst: $Fe_2O_3$

| Concentration of $H_2O_2$ (%) | Supply (ml) | Evolution of oxygen (ml $O_2$/h) |
| --- | --- | --- |
| 1.2 | 130 | 17 |
| 0.8 | 80 | 10 |
| 0.5 | 40 | 4.5 |

TABLE VII

Catalyst: Nickel Oxide
Starting Pressure in the Supply Container: 0.3 bar

| Concentration of $H_2O_2$ (%) | Supply (ml) | Evolution of oxygen (ml $O_2$/h) |
| --- | --- | --- |
| 3 | 150 | 51 |
| 2 | 90 | 35 |
| 1.8 | 30 | 16 |

TABLE VIII

Catalyst: Nickel Oxide

| Concentration of $H_2O_2$ (%) | Supply (ml) | Evolution of oxygen (ml $O_2$/h) |
| --- | --- | --- |
| 1.1 | 140 | 17 |
| 0.7 | 80 | 8.5 |
| 0.5 | 40 | 4 |

It will be understood that each of the elements described above, or two or more together, may also find a useful application in other types of gaseous enrichments differing from the types described above.

While the invention has been illustrated and described as embodied in a process and an apparatus for enriching liquids with oxygen, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A process for enriching a liquid with oxygen by means of a catalyst and a liquid which gives off oxygen under the effect of that catalyst, comprising introducing an an approximately 0.1 to 5% hydrogen peroxide solution into a container, immersing said container, closed with a porous molding in the pores of which is incorporated as catalyst manganese dioxide, $Fe_2O_3$ and/or nickel oxide, into said liquid to be enriched with oxygen so that at least the entire porous molding is immersed, and allowing the hydrogen peroxide to pass through the porous molding under the effect of excess pressure building up in said container through the formation of oxygen therein, so that again oxygen is given off by said hydrogen peroxide, which oxygen for the most part is fed to the liquid to be enriched with oxygen.

2. Process according to claim 1, employing as catalyst manganese dioxide.

3. Process for enriching a liquid with oxygen according to claim 1, wherein said liquid is in an aquarium.

4. Process for enriching a liquid with oxygen according to claim 1, wherein said liquid is water.

5. Apparatus for enriching a liquid with oxygen by means of a catalyst and a liquid which gives off oxygen under the effect of that catalyst, comprising a storage vessel containing an approximately 0.1 up to 5% hydrogen peroxide solution which gives off oxygen under the effect of a catalyst, said storage vessel being closed with a porous molding containing the catalyst, said catalyst being selected from the group consisting of manganese dioxide, $Fe_2O_3$, and nickel oxide so that said storage vessel can be immersed with the porous molding into the liquid to be enriched with oxygen to the extent that at least the entire porous molding is immersed therein.

6. Apparatus according to claim 5, wherein said porous molding containing said catalyst comprises a tube having at least one empty space extending over its entire length, one end of said tube being tightly sealed and the other end of said tube being tightly connected to said storage vessel.

7. Apparatus according to claim 5, wherein said porous molding containing said catalyst comprises a hollow body having an empty space with an internal diameter of at least 0.5 mm extending over its entire length.

8. Apparatus according to claim 5, wherein said porous molding is composed of polypropylene, MgO, $Al_2O_3$ or clay.

* * * * *